United States Patent [19]

Haga et al.

[11] Patent Number: 4,594,037

[45] Date of Patent: Jun. 10, 1986

[54] MULTI-SPINDLE UNIT

[75] Inventors: Katutoshi Haga; Takehusa Sasamori; Teizi Kurita; Noriaki Katumata, all of Toyota, Japan

[73] Assignees: Fuji Seiko Limited; Toyota Jidosha Kabushiki Kaisha, both of Aichi, Japan

[21] Appl. No.: 647,891

[22] Filed: Sep. 6, 1984

[30] Foreign Application Priority Data

Sep. 14, 1983 [JP] Japan .................... 58-142863[U]

[51] Int. Cl.⁴ ............................................ B23B 39/16
[52] U.S. Cl. .................................... 409/144; 408/47
[58] Field of Search ............... 409/144, 217; 408/46, 408/47, 48, 53

[56] References Cited

U.S. PATENT DOCUMENTS

| | | | |
|---|---|---|---|
| 495,325 | 4/1893 | Girdany | 409/144 |
| 1,452,921 | 4/1923 | McLellan | 408/47 |
| 2,530,502 | 11/1950 | Baney | 409/144 |
| 3,279,268 | 10/1966 | Zagar | 408/47 |
| 3,687,564 | 8/1972 | Cupler | 408/47 |

Primary Examiner—Jimmy C. Peters
Attorney, Agent, or Firm—Parkhurst & Oliff

[57] ABSTRACT

A multi-spindle unit for holding and rotating a plurality of rotary cutting tools has a unit body fixed to a first spindle of a machine tool, a rotatable shaft concentric with the unit body, and a plurality of secondary spindles each having a tool mounting portion at one end thereof. The rotatable shaft is coupled at one end portion to the unit body for receiving a torque from the holder body, the rotatable shaft being displaceable relative to the holder body. A rotation transmitting mechanism is provided to transmit a rotary motion of the rotatable shaft to the secondary spindles. A positioning member is fixedly disposed radially outwardly of the first spindle, and a cylindrical casing is disposed radially outwardly of the rotatable shaft such that the casing and the shaft are rotatable relative to each other. The casing is engageable with the positioning member for positioning thereof by the positioning member, and thereby positioning the secondary spindles.

15 Claims, 2 Drawing Figures

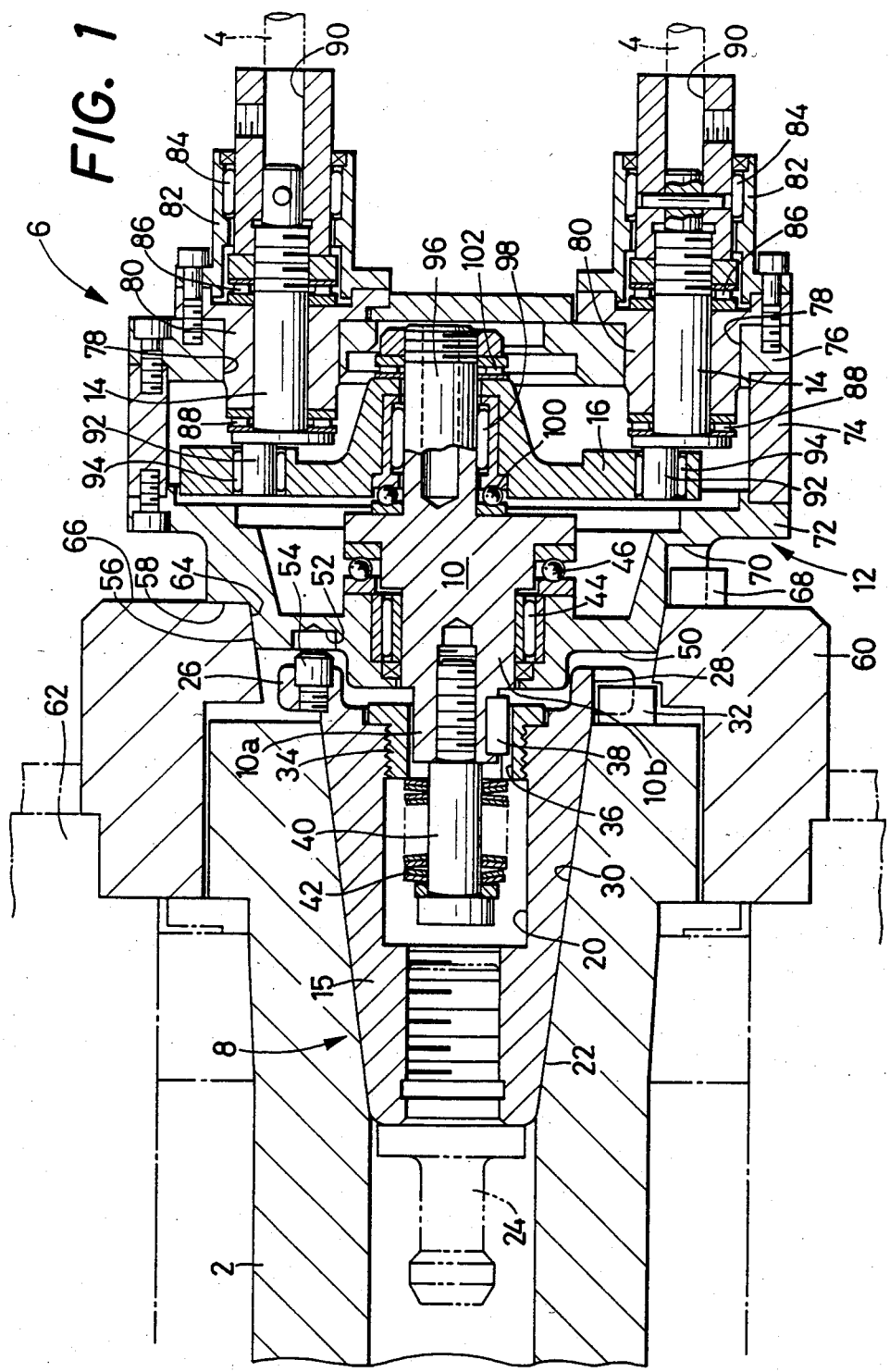

MULTI-SPINDLE UNIT

BACKGROUND OF THE INVENTION

The present invention relates generally to a multi-spindle unit attached to a spindle of a machine tool for supporting a plurality of cutting tools rotated by the machine spindle. More particularly, the invention is concerned with such a unit for rotary cutting tools, which allows the rotary cutting tools to perform high-precision machining, unaffected by positioning error of the unit with respect to the machine spindle.

Various tool holders have been used for mounting drills, milling cutters, reamers, boring bars and other rotary cutting tools on spindles of machine tools such as drilling, milling and boring machines, and machining centers which are capable of automatically performing multiple kinds of cutting operations. Such a tool holder supports a tool at its one end portion, and is adapted to be removably fixed to the machine spindle at the other end portion.

However, surfaces of the tool holder for fitting, positioning and other purposes with respect to the machine spindle are liable to wear due to mounting and dismounting of the tool holder to and from the machine spindle. Further, these surfaces are subject to cutting chips, dust and dirt, and other foreign matter. As a result, the tool holder does not always make a sufficiently snug fit in the spindle. Thus, it has been difficult or impossible to avoid a positioning error of the tool holder due to misalignment or inclination of its centerline with respect to the centerline of the spindle. This positioning error or misalignment of the tool holder results in an increase in run-out of the boring bar at the free end of the holder, and consequently leads to machining errors such as an oversize bore diameters bored by the boring bar. That is, the positioning error of the tool holder lowers the accuracy of machining with the tool. Such positioning error of a tool holder will give rise to serious trouble, particularly in fine-boring, reaming and other machining operations which require relatively high accuracy.

In view of the above problem, one of the inventors of the present application and his co-workers proposed, in the pending patent application Ser. No. 625,960 filed June 29, 1984 (assigned to the assignees of the present application), a holder for a rotary cutting tool which is capable of preventing a decrease in accuracy of machining by the tool due to positioning error of the holder with respect to the machine spindle. This tool holder has a holder body fixed to a spindle of a machine tool and a rotatable shaft disposed concentrically with the holder body and having a tool mounting portion at its one end. The rotatable shaft is coupled at its other end portion to the holder body for receiving a torque from the holder body and is axially and radially displaceable relative to the holder body. Further, the tool holder has a positioning member fixedly disposed radially outwardly of the spindle and a casing disposed radially outwardly of the rotatable shaft such that the casing and the shaft are rotatably relative to each other. The casing is engageable with the positioning member for accurate positioning thereof by the positioning member, and thereby positioning the rotatable shaft, while the holder body is fixed to the spindle.

In such a tool holder, a rotary cutting tool is fixed to one end portion of the rotatable shaft. The rotatable shaft is positioned by the casing, which is accurately positioned by the positioning member disposed fixedly around the outer circumference of the free end of the spindle. Accordingly, a possible misalignment of the holder body with respect to the spindle will not affect a machining accuracy of the rotaty cutting tool carried by the rotatable shaft. In other words, the accurate positioning of the casing permits a high-precision machining.

Thereafter, however, there have arisen requirements for improvements in not only machining accuracy but also machining efficiency, by accomplishing simultaneous machining of plural bores.

SUMMARY OF THE INVENTION

It is accordingly an object of the present invention to provide a multi-spindle unit, which is a rotary cutting tool holder attached to a first spindle of a machine tool and equipped with a plurality of secondary spindles which are simultaneously driven by the first spindle, and positioned with high accuracy, irrespective of a positioning error of the multi-spindle unit with respect to the first spindle of the machine.

According to the invention, there is provided a multi-spindle unit for holding a plurality of rotary cutting tools, which is attachable to a first spindle of a machine tool for rotary cutting movements of the cutting tools by the first spindle, comprising:

(1) a unit body removably fixed to the first spindle for rotation thereof about an axis of the first spindle;

(2) a rotatable shaft axially and radially displaceable relative to the unit body, the rotatable shaft being coupled at one end portion thereof to the unit body for receiving a torque from the unit body;

(3) a positioning member fixedly disposed radially outwardly of the first spindle;

(4) a casing disposed radially outwardly of the rotatable shaft such that the casing and the shaft are rotatable relative to each other, the casing being engageable with the positioning member for accurate alignment of its centerline with the first spindle and for accurate circumferential positioning thereof about its centerline with the unit body is fixed to the first spindle;

(5) a plurality of secondary spindles disposed in the casing at a plurality of locations radially spaced from the axis of the rotatable shaft and rotatable about axes thereof parallel to the axis of the rotatable shaft, each secondary spindle having a tool mounting portion at its respective free end portion which protrudes from the casing to rotatably support a cutting tool; and (6) a rotation transmission mechanism disposed within the casing, for transmitting rotary movement of the rotatable shaft to the secondary spindles.

In the above multi-spindle unit, the casing is accurately positioned by the positioning member and the secondary spindles supporting the individual rotary cutting tools are positioned with high accuracy by the casing, unaffected by a positioning error of the unit body with respect to the first spindle. In other words, since the alignment of the centerline of the casing and the circumferential angular position thereof about the centerline are accurately established with respect to the first spindle, each of the secondary spindles held by the casing is accurately positioned in the radial and circumferential directions, thereby permitting drilling, reaming, boring, and other machining operations with high accuracy. Further, cutting reaction forces applied from the plurality of rotary cutting tools to the plurality of secondary spindles are received by the machine tool such as a boring machine, a drilling machine and a machining center, with high rigidity via the casing and the positioning member. This effectively prevents displacement of each rotary cutting tool caused by the cutting reaction force and allows considerable heavy-duty cutting, thereby ensuring simultaneous machining of a plurality of bores with remarkably improved machining efficiency.

According to one embodiment of the invention, the rotation transmission mechanism comprises a first eccentric shaft portion provided at one end of the rotatable shaft remote from the unit body. The first eccentric shaft portion is eccentric with respect to the rotatable shaft. The transmission mechanism further comprises a plurality of secondary eccentric shaft portions corresponding to the secondary spindles. Each of the secondary eccentric shaft portions is provided on one end of the corresponding secondary spindle opposite to the end thereof at which the cutting tool is mounted. The secondary eccentric shaft portion is eccentric with respect to the corresponding secondary spindle, such that the amount of eccentricity thereof to the secondary spindle is equal to that of the first eccentric shaft portion to the rotatable shaft. The transmission mechanism further comprises an oscillating plate which has a plurality of holes engaging the first eccentric shaft portion and the secondary eccentric shaft portions to transmit the rotary movement of the rotatable shaft to the secondary spindles.

According to another embodiment of the invention, the rotation transmission mechanism comprises a train of gears connecting the rotatable shaft and the secondary spindles.

According to a further embodiment of the invention, the casing comprises a first end plate engageable with the positioning member, a second end plate and an annular spacer connecting the first and second end plates with a distance therebetween axially of the rotatable shaft. The secondary spindles are rotatably supported by the second end plate.

In one form of the above further embodiment of the invention, the second end plate is provided with a plurality of boss or bushing members corresponding to the secondary spindles and secured to the second end plate, and further provided with a plurality of bearings corresponding to the plurality of boss members. The secondary spindles are rotatably supported by the boss members via the bearings.

BRIEF DESCRIPTION OF THE DRAWINGS

The above and other objects, features and advantages of the present invention will be better understood from reading the following description of the preferred embodiment taken in connection with the accompanying drawing in which:

FIG. 1 is an elevational view in longitudinal cross section of an embodiment of a multi-spindle unit for rotary cutting tools of the present invention, which is mounted on a spindle of a boring machine; and FIG. 2 is an elevational end view illustrating the right side of the embodiment shown in FIG. 1.

DETAILED DESCRIPTION OF THE PREFERRED EMBODIMENT

To further clarify the present invention, a preferred embodiment of a multi-spindle unit as applied to rotary cutting tools for a machine tool will be described in greater detail, referring to FIGS. 1 and 2.

In FIG. 1, the reference character 2 designates a cylindrical spindle 2 of a boring machine, which is rotated about its axis and acts as a first spindle. A multi-spindle unit 6 for holding a plurality of rotary cutting tools 4 is attached to a free end of the first spindle 2. The multi-spindle unit 6 simultaneously imparts rotary movements of the first spindle 2 to the rotary cutting tools 4.

The unit 6 comprises a unit body 8 removably fixed to the first spindle 2, a rotatable shaft 10 which is axially and radially displaceable relative to the unit body 8 and is coupled at one end portion thereof to the unit body 8 for receiving torque from the unit body 8, a casing 12 which is rotatable relative to the rotatable shaft 10, a plurality of secondary spindles 14 which are rotatably supported parallel to the rotatable shaft 10 by the casing 12, and an oscillating plate 16 which transmits rotations of the rotatable shaft 10 to the secondary spindles 14.

The unit body 8 consists of a shank member 15 and a torque member 34 which is of ring shape and is screwed into shank member 15. The shank member 15 has a stepped axial hole 20 and an outer circumferential tapered surface 22. The axial hole 20 is formed through a radially central portion of the shank member 15. The outer circumferential tapered surface 22 gradually decreases in outside diameter toward a rear end portion, i.e. a small-diameter end portion, of the shank member 15. A pull stud 24 is fixed to the rear end portion of the shank member 15, i.e., of the unit body 8, such that the stud 24 extends from the unit body 8 in the axial direction. The unit body 8 includes an annular flange portion 26 which protrudes radially outwardly from the outer circumference at its large-diameter end, and perpendicularly to the axis of the unit body 8. The annular flange portion 26 has a cutout 28 which receives or engages a boss 32 provided on the end face of the first spindle 2 at a location out of the center thereof, in order to prevent a relative rotation between the first spindle 2 and the unit body 8 when the unit body 8 has been sufficiently pulled into the first spindle 2, that is, when the outer circumferential tapered surface 22 of the unit body 8 has come into close contact with an inner tapered surface 30 formed in the free end portion of the first spindle 2.

The rotatable shaft 10 is a stepped diameter shaft having a circular cross section. A small-diameter portion 10a of the rotatable shaft 10, with which the unit body 8 is associated, loosely fits in a through-hole formed in the torque member 34. An inner circumferential surface of the torque member 34 has a key slot 36 parallel to the centerline thereof. A key 38 fixed to the rotatable shaft 10 is fitted to the key slot 36 of the rotatable shaft 10 such that the rotatable shaft 10 is able to move relative to the unit body 8 in the axial direction and cannot rotate relative to the unit body 8. A bolt 40 is threaded axially in the small-diameter portion 10a and a medium-diameter portion 10b of the rotatable shaft 10. Belleville or coned disc springs 42 are disposed, acting as elastic members, between the head of the bolt 40 and the torque member 34, to bias the rotatable shaft 10 toward the unit body 8. In other words, the rotatable shaft 10 and the unit body 8 are coupled to each other so that they are movable axially relative to each other against a resilient force of the coned disc springs 42. Further, they are coupled to allow a small degree of inclination and radial displacement of axes of the unit body 8 and the rotatable shaft 10 relative to each other.

The casing 12 is mounted on the rotatable shaft 10 via a radial bearing 44 and a thrust ball bearing 46 such that the casing 12 is rotatable relative to the rotatable shaft 10. The casing 12 has an end face 50 which is abuttable on the flange portion 26 of the unit body 8. When the unit 6 is not mounted on the first spindle 2, the end face 50 is pressed against the end face of the flange portion 26 by the biasing force of coned disc springs 42 which is transmitted via the bolt 40, the rotatable shaft 10, and the thrust ball bearing 46. When the unit 6 is mounted on the first spindle 2, the end face 50 is slightly spaced from the flange portion 26 as shown in FIG. 1. The end face 50 has a recess 52 and the flange portion 26 has a protrusion 54 which engages the recess 52 for preventing the unit body 8 and the casing 12 from rotating relative to each other.

Further, the casing 12 has an outer circumferential tapered surface 56 and an end face 58. The outer circumferential tapered surface 56 is tapered such that its diameter is gradually decreased toward the unit body 8. The end face 58 extends outwardly in the radial direction from the large diameter end of the outer circumferential tapered surface 56. The casing 12 is held in close contact with a positioning member 60 at the outer circumferential tapered surface 56 and the end face 58. The positioning member 60 is a generally annular member which is accurately pre-positioned and secured to a body 62 of the boring machine so as to surround the free end portion of the first spindle 2. The positioning member 60 has an inner circumferential tapered surface 64 which can be tight-fitted to the aforementioned outer circumferential tapered surface 56, and an end face 66 which is abuttable on the aforementioned end face 58. That is, the end faces 58 and 66 act as abutment faces. The positioning member 60 is provided with a positioning protrusion 68 at a location spaced as far as possible from the centerline thereof. The postioning protrusion 68 accurately engages a positioning cutout 70 which is formed in the casing 12 to fit the protrusion 68, so that the circumferential angular position of the casing 12 with respect to the positioning member 60 is exactly established.

In addition to a coned disc-shaped first member 72 having the aforementioned end face 50, the outer circumferential tapered surface 56, the end face 58 and other portions, the casing 12 comprises a short cylindrical second member 74 and a disc-shaped third member 76. The second member 74 is secured to a radially outward portion of the first member 72, and the third member 76 covers an open end of the second member 74. Therefore, the casing 12 forms a closed cylindrical container which consists of a first end plate in the form of the first member 72, a second end plate in the form of the third member 76, and an annular spacer in the form of the second member 74 connecting the two end plates with a distance therebetween axially of the rotatable shaft 10. The third member 76 has a plurality of fitting holes 78 at positions located radially away from the centerline of the aforementioned rotatable shaft 10, i.e., the centerline of the casing 12 as clearly illustrated in FIG. 2. Boss members 80 are fixedly fitted in the holes 78. Each of the secondary spindles 14 is rotatably supported by the corresponding boss member 80 via a bearing housing 82, a radial bearing 84, and thrust bearings 86 and 88. Each secondary spindle 14 consists of several members for the convenience of an assembly. After the assembly, each secondary spindle 14 functions as a unitized spindle. The secondary spindle 14 has a tool mounting hole 90 for accomodating a rotary cutting tool 4 at its one end portion. At its other end portion, the secondary spindle 14 has an eccentric shaft portion 92, the axis of which is offset a certain distance from the axis of rotation of the spindle 14.

The eccentric shaft portion 92 of each secondary spindle 14 is engaged with the oscillating plate 16 via a radial bearing 94. The oscillating plate 16 is generally a disc-shaped member. A radially outward portion of the oscillating plate 16 has a plurality of holes into which the eccentric shaft portions 92 are fitted. An axially central portion of the oscillating plate 16 has a fitting hole in which is rotatably received, via a radial bearing 98 and thrust bearings 100 and 102, an eccentric shaft portion 96 which is projectingly provided at the free end portion of the rotatable shaft 10. The rotatable shaft 10, its eccentric shaft portion 96, the secondary spindles 14 and their eccentric shaft portions 92 are all disposed parallel to each other, and an eccentricity of the eccentric shaft portion 96 to the rotation axis of the rotatable shaft 10 is equal to that of the eccentric shaft portion 92 to the secondary spindle 14. Therefore, when the rotatable shaft 10 rotates, the osscillating plate 16 makes oscillating motions in a circular locus around the rotation axis of the rotatable shaft 10, whereby rotations of the rotatable shaft 10 are transmitted to the secondary spindles 14. As seen from the foreoing, a rotation transmission mechanism of the present embodiment comprises the oscillating plate 16, and the eccentric shaft portions 92 and 96.

After the rotary cutting tools 4, such as reamers, drills, and boring tools, are set in the secondary spindles 14, the unit 6 constructed as described hitherto is mounted to the boring machine. Before the unit 6 is mounted on the boring machine, the unit body 8 and the casing 12 are biased into close contact with each other at the flange portion 26 and the end face 50 by the resilient force of the coned disc springs 42. Also, the unit body 8 and the casing 12 are not allowed to rotate relative to each other by the engagement of the protrusion 54 and the recess 52.

When the unit 6 is in such a state, the unit body 8 is inserted into the bore (30) of the first spindle 2 while the positioning protrusion 68 of the positioning member 60 is aligned with the positioning cutout 70 of the casing 12. More specifically, the positioning protrusion 68 and the positioning cutout 70 are first engaged to position the casing 12 circumferentially. Then, the outer circumferential tapered surface 56 of the casing 12 is brought into contact with the inner circumferential tapered surfaces 64 of the positioning member 60. The pull stud 24 is then pulled by a drawbar (not shown) and the outer circumferential tapered surface 22 of the unit body 8 is tight-fitted on the inner circumferential tapered surface 30 of the first spindle 2. As this tight-fitting action occurs, the coned disc springs 42 are compressed by the torque member 34 and a resultant resilient force of the coned disc springs 42 is transmitted to the casing 12 via the bolt 40, the rotatable shaft 10 and the thrust ball bearing 46, forcing the casing 12 against the positioning member 60. Therefore, the outer circumferential tapered surface 56 of the casing 12 is tight-fitted on the inner circumferential tapered surface 64 of the positioning member 60. Also, the end face 58 of the casing 12 is brought into abutment on the end face 66 of the positioning member 60, thereby eliminating misalignment and inclination of the centerline of the casing 12. In this case, since the rotatable shaft 10 and the secondary spindles 14 have been accurately positioned to the casing 12, and the rotatable shaft 10 is axially and radially displaceable relative to the unit body 8, the casing 12 is accurately positioned by the positioning member 60, unaffected by a positioning error of the unit body 8 with respect to the first spindle 2. Therefore, the secondary spindles 14 are accurately positioned because they are accurately supported by the casing 12.

When the unit 6 is mounted on the boring machine, rotations of the spindle 2 are transmitted to the unit body 8 by the engagement of the protrusion 32 and the cutout 28, and are then transmitted to the rotatable shaft 10 by the engagement of the key slot 36 of the torque member 34 and the key 38. The rotations of the rotatable shaft 10 are further transmitted to the secondary spindles 14 through the eccentric shaft portion 96, the oscillating plate 16 and the eccentric shaft portions 92, thereby rotating the rotary cutting tools mounted on the second spindles 14. Accordingly, if a workpiece is positioned at a certain location with respect to the unit 6, and the unit 6 or the workpiece is advanced so that the workpiece and the unit 6 move toward each other, a plurality of holes can be machined at the same time. In this case, the casing is in close contact with the end face 66 of the positioning member 60 at a location sufficiently spaced from the centerline. Also, the positioning protrusion 68 and the positioning cutout 70 are accurately engaged at a location sufficiently spaced from the centerline. Therefore, the casing 12 is not inclined or rotated by cutting reaction forces which are applied from the rotary cutting tools 4 to the secondary spindles 14, thus permitting the unit 6 to support a plurality of rotary cutting tools with high rigidity.

When it is required to dismount the unit 6 from the first spindle 2, a pulling force applied to the pull stud 24 is removed to permit the unit body 8 to be disengaged from the first spindle 2 with the biasing force of the springs 42, and the flange portion 26 of the unit body 8 is brought into contact with the end face 50 of the casing 12. Then, by further applying a pushing force to the unit body 8 via the pull stud 24, the pushing force is transmitted from the flange portion 26 to the casing 12, and the engagement of the casing 12 with the positioning member 60 is released, whereby the unit 6 is ready to be dismounted.

While the present invention has been described in its preferred embodiment suitable for holding rotary cutting tools for a boring machine, it is to be understood that the invention may be otherwise embodied.

For example, it is not necessarily a requirement to use a rotation transmission mechanism comprising the oscillating plate 16 and the eccentric shaft portions 92 and 96 for transmitting rotations of the rotatable shaft 10 to the plural second spindles 14. Instead, it is possible to utilize another rotation transmission mechanism, such as a gear train, for transmitting rotations of the rotatable shaft 10 to the second spindles 14. Also, a means for positioning the casing 12 to the positioning member 60 is not limited to the one used in the embodiment. As described in the specification and shown in the accompanying drawing of the patent application identified in the introductory part of the present application, it is possible to employ another means, e.g., to provide plural positioning pins on the casing parallel to the centerline thereof and accurately fit the positioning pins into positioning holes formed in the positioning member.

It will be obvious from the foregoing detailed description that many changes and modifications can be made to the embodiment described in detail without departing from the spirit or scope of the invention.

What is claimed is:

1. A multi-spindle unit for holding a plurality of rotary cutting tools, which is attachable to a first spindle of a machine tool, comprising:
    a unit body removably fixed to the first spindle for rotation thereof about an axis of the first spindle;
    a rotatable shaft axially and radially displaceable relative to said unit body, and coupled at one end portion thereof to said unit body for receiving torque from said unit body;
    a positioning member fixedly disposed radially outwardly of said first spindle;
    a casing disposed radially outwardly of said rotatable shaft such that said casing and said rotatable shaft are rotatable relative to each other, said casing being engageable with said positioning member for accurate alignment of a centerline of said casing with said first spindle and for accurate circumferential positioning thereof about said centerline when said unit body is fixed to said first spindle;
    a plurality of secondary spindles rotatably disposed in said casing at a plurality of locations radially spaced from an axis of said rotatable shaft, each secondary spindle being rotatable about an axis thereof substantially parallel to said axis of the rotatable shaft and having a tool mounting portion at a free end portion thereof which protrudes from said casing to rotatably support a cutting tool; and
    a rotation transmission mechanism disposed within said casing for transmitting rotary movement of said rotatable shaft to said secondary spindles.

2. A multi-spindle unit as set forth in claim 1, wherein said rotation transmission mechanism comprises:
    a first eccentric shaft portion provided at one end of said rotatable shaft remote from said unit body, said first eccentric shaft portion being eccentric with respect to said rotatable shaft;
    a plurality of second eccentric shaft portions, each provided on an end of a respective one of said secondary spindles opposite to the end thereof at which said cutting tool is mounted, each said second eccentric shaft portion being eccentric with respect to its respective secondary spindle, an amount of eccentricity of each said second eccentric shaft portion to its respective said secondary spindle being equal to that of said first eccentric shaft portion to said rotatable shaft; and
    an oscillating plate having a plurality of holes formed therein, each said hole engaging a respective one of said first eccentric shaft portion and said second eccentric shaft portions, thereby to connect said first and second eccentric shaft portions to transmit the rotary movement of the rotatable shaft to said secondary spindles.

3. A multi-spindle unit as set forth in claim 1, wherein said casing comprises:
    a first end plate engageable with said positioning member;
    a second end plate; and
    an annular spacer connecting said first and second end plates while maintaining a distance therebetween axially of said rotatable shaft, said secondary spindles being supported by said second end plate.

4. A multi-spindle unit as set forth in claim 3, wherein said second end plate is provided with a plurality of boss members corresponding to said secondary spindles and secured to said second end plate, and further is provided with a plurality of bearings corresponding to said plurality of boss members, said secondary spindles being rotatably supported by said boss members via said bearings.

5. A multi-spindle unit as set forth in claim 1, wherein said first spindle has a bore formed centrally therein; said unit body comprises:
   (a) a shank member which is engageable with said bore formed in said first spindle, and which has an axial hole formed therein concentric with the shank member; and
   (b) a torque member for transmitting torque from said shank member to said rotatable shaft, said torque member having a central through-hole formed therein, and being fixed in said axial hole of said shank member such that said central through-hole of the torque member is concentric with said axial hole of said shank member;

and wherein said one end portion of said rotatable shaft has a small-diameter portion which extends through said central through-hole of said torque member with a slight radial clearance therebetween for allowing a slight degree of inclination and radial displacement of said axis of said rotatable shaft with respect to an axis of said shank member.

6. A multi-spindle unit as set forth in claim 1, further comprising biasing means disposesd between said unit body and said rotatable shaft to bias the unit body and the rotatable shaft toward each other along said axis of said rotatable shaft, and wherein said casing engages said positioning member before said unit body has been fixed in place in said first spindle, and said unit body is axially movable against a biasing force of said biasing means relative to said rotatable shaft so as to force said casing onto said positioning member.

7. A multi-spindle unit as set forth in claim 5, further comprising:
   a bolt fixed to one end of said small-diameter portion and which extends in said axial hole in said shank member in an axial direction away from said one end of the small-diameter portion and has a head portion at a free end thereof;
   biasing means disposed between said head portion of said bolt and said torque member, said biasing means biasing said torque member and said rotatable shaft toward each other along the axis of the rotatable shaft, said unit body being axially movable by a slight distance against a biasing force of said biasing means away from said rotatable shaft after said casing has engaged said positioning member, whereby said casing is held in pressed engagement with said positioning member.

8. A multi-spindle unit as set forth in claim 7, wherein said biasing means comprises a plurality of coned disc springs through which said bolt extends.

9. A multi-spindle unit as set forth in claim 1, further comprising biasing means for biasing said unit body and said casing toward each other along axes thereof, said casing and said positioning member having tapered surfaces which are complementary with each other, and further having opposite abutment faces which are perpendicular to the axis of said casing, said tapered surfaces engaging each other, and said abutment faces abutting on each other, with surface pressures produced by a resilient force of said biasing means after the unit has been attached to said spindle, whereby said casing is positioned by said positioning member.

10. A multi-spindle unit as set forth in claim 1, wherein said unit body further comprises an annular flange portion extending radially outwardly from an outer circumferential surface at one end portion of the unit body to which said rotatable shaft is coupled, said annular flange portion having a cutout and said first spindle having a boss on an end face thereof which is engageable with said cutout in said flange portion of the unit body when the unit is attached to said first spindle, thereby to prevent relative rotation between said first spindle and said unit.

11. A multi-spindle unit as set forth in claim 1, wherein said casing further comprises an annular flange portion extending radially outwardly from an outer circumferential surface at one end of the casing opposite to said unit body, said annular flange portion having a cutout, and wherein said positioning member has a protrusion on an end face thereof which is engageable with said cutout in said flange portion of the casing when the unit is attached to said first spindle, thereby preventing a relative rotation between said positioning member and said casing.

12. A multi-spindle unit as set forth in claim 1, wherein said tool mounting portion of each secondary spindle has a tool-insertion hole formed along an axis of the secondary spindle, said tool-insertion hole accommodating a shank of said rotary cutting tool for fixation thereof to the secondary spindle.

13. A multi-spindle unit as set forth in claim 1, further comprising a circumferential lock mechanism for preventing a relative rotation between said casing and said unit body while the unit is not attached to first spindle, and for allowing said relative rotation therebetween when said unit is attached to said first spindle.

14. A multi-spindle unit for holding a plurality of rotary cutting tools, which is attachable to a first spindle of a machine tool, comprising:
   a unit body removably fixed to the first spindle for rotation thereof about an axis of the first spindle;
   a rotatable shaft axially and radially displaceable relative to said unit body, and coupled at one end portion thereof to said unit body for receiving torque from said unit body;
   a positioning member fixedly disposed radially outwardly of said first spindle;
   a casing disposed radially outwardly of said rotatable shaft such that said casing and said rotatable shaft are rotatable relative to each other, said casing being engageable with said positioning member for accurate alignment of a centerline of said casing with said first spindle and for accurate circumferential positioning thereof about said centerline when said unit body is fixed to said first spindle;
   biasing means for holding said casing in pressed engagement with said positioning member after said unit body has been fixed in place in said first spindle;
   a plurality of secondary spindles disposed in said casing at a plurality of locations radially spaced from an axis of said rotatable shaft, each secondary spindle being rotatable about an axis thereof parallel to said axis of the rotatable shaft and having a tool mounting portion at a free end portion thereof which protrudes from said casing to rotatably support a cutting tool; and a rotation transmission mechanism disposed within said casing for transmitting rotary movement of said rotatable shaft to said secondary spindles.

15. A multi-spindle unit for holding a plurality of rotary cutting tools, which is attachable to a first spindle of a machine tool, comprising:

a unit body removably fixed to the first spindle for rotation thereof about an axis of the first spindle, said unit body having a bore formed centrally therein;

a torque member removably fixed in said bore of said unit body for rotation therewith, said torque member having a through-hole formed centrally therein with a key slot formed in an inner circumferential surface of said through-hole;

a rotatable shaft axially and radially displaceable relative to said unit body, having a diameter less than a diameter of said through-hole of said torque member at one end portion thereof, and further having a key extending radially from said one end portion engageable with said key slot of said torque member, thereby to couple said rotatable shaft to said unit body through said torque member for receiving torque from said unit body;

a positioning member fixedly disposed radially outwardly of said first spindle;

a casing disposed radially outwardly of said rotatable shaft such that said casing and said rotatable shaft are rotatable relative to each other, said casing being engageable with said positioning member for accurate alignment of a centerline of said casing with said first spindle and for accurate circumferential positioning thereof about said centerline when said unit body is fixed to said first spindle;

a plurality of secondary spindles rotatably disposed in said casing at a plurality of locations radially spaced from an axis of said rotatable shaft, each secondary spindle being rotatable about an axis thereof parallel to said axis of the rotatable shaft and having a tool mounting portion at a free end portion thereof which protrudes from said casing to rotatably support a cutting tool; and a rotation transmission mechanism disposed within said casing for transmitting rotary movement of said rotatable shaft to said secondary spindles.

* * * * *